INVENTOR.
Bernard Delebarre

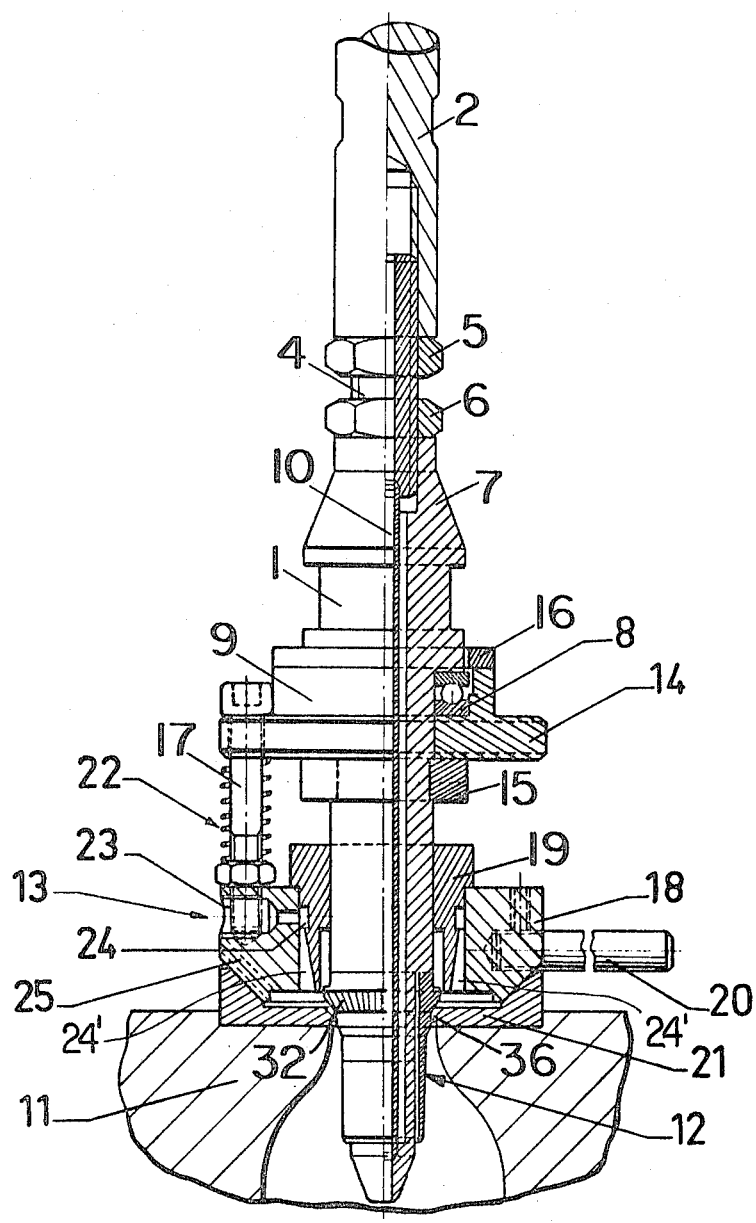

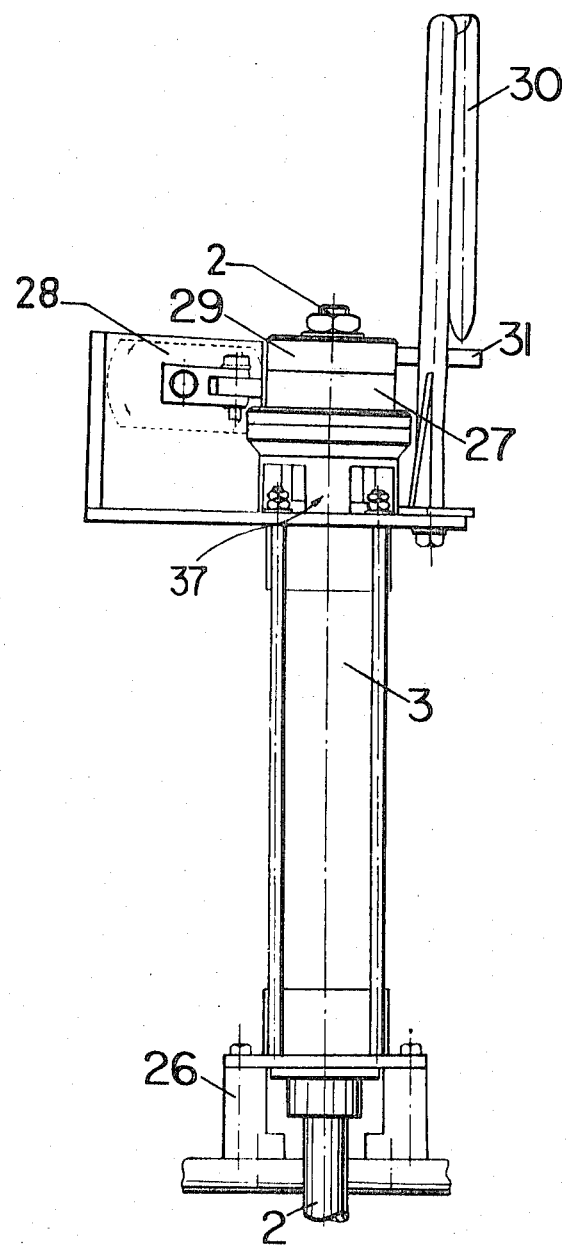

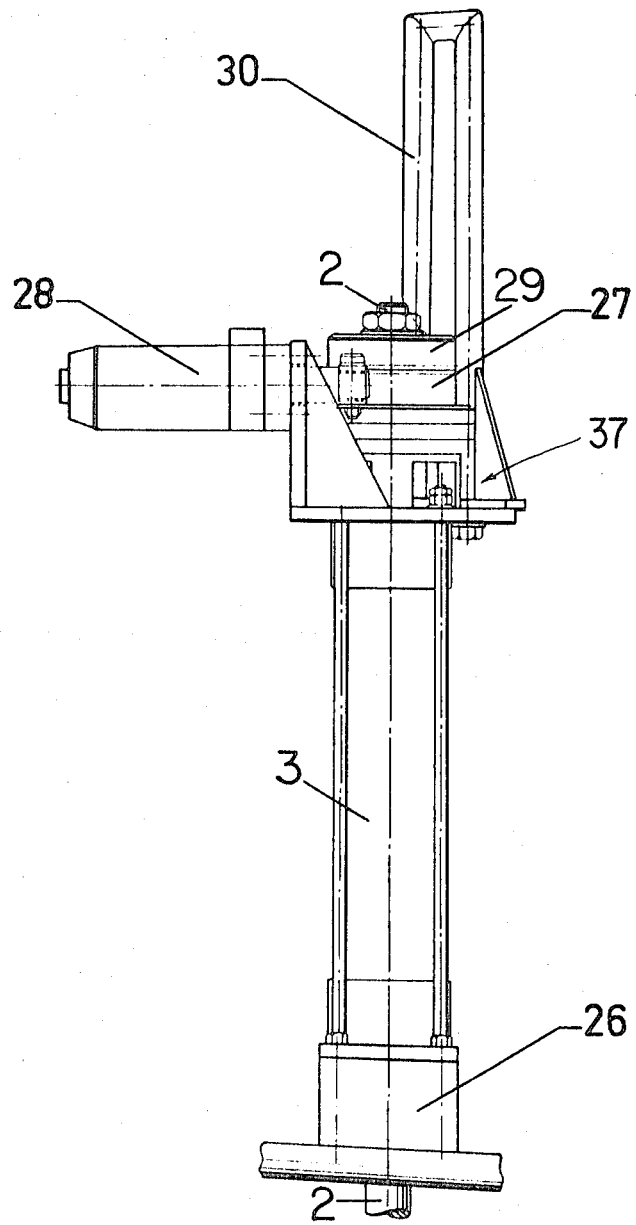

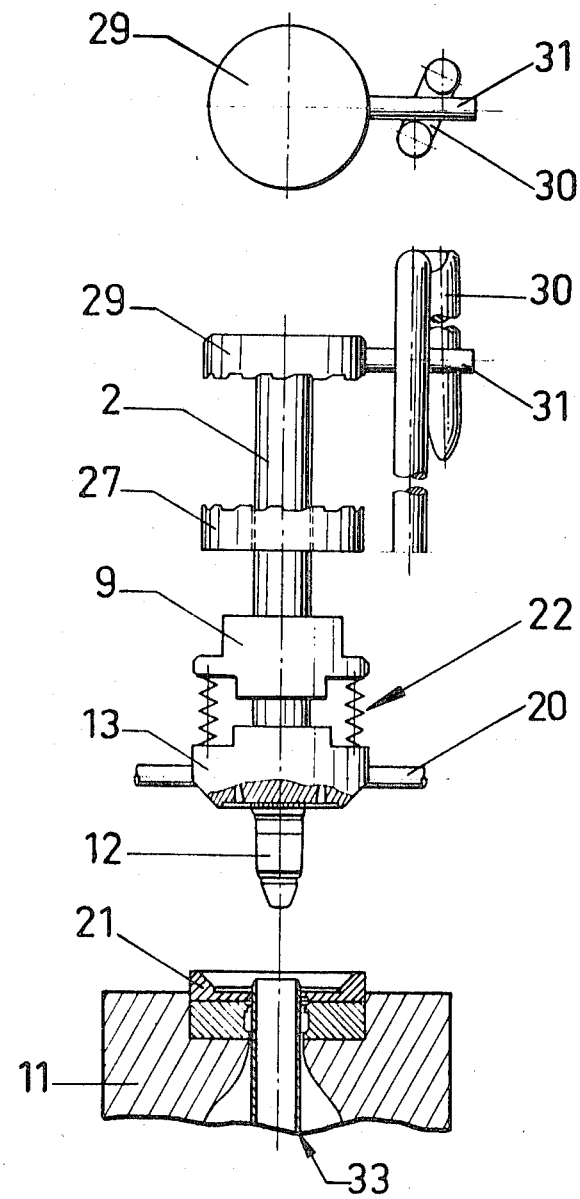

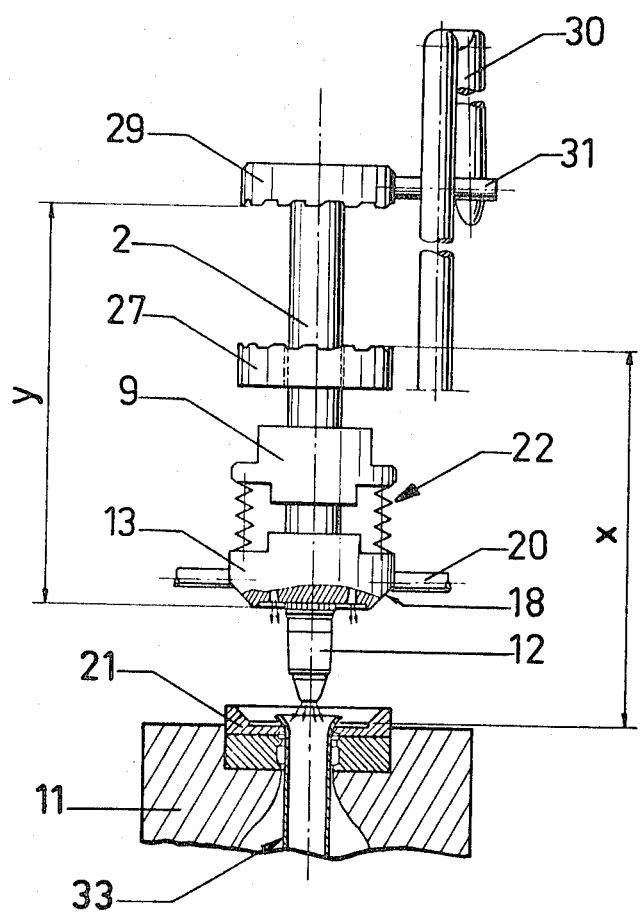

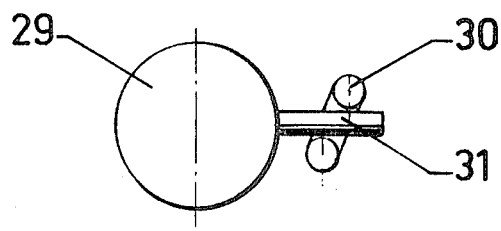
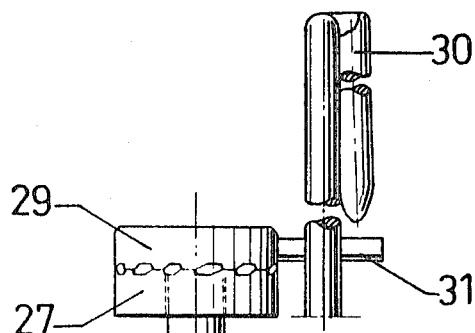
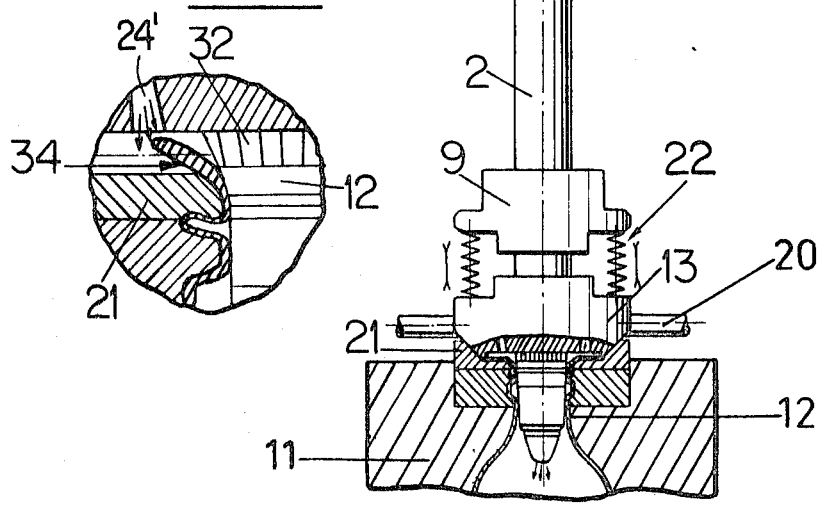

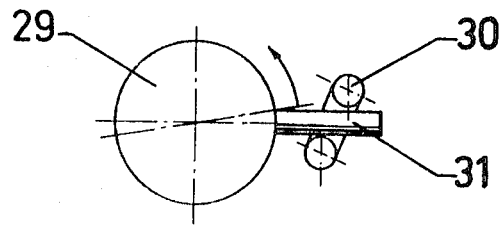
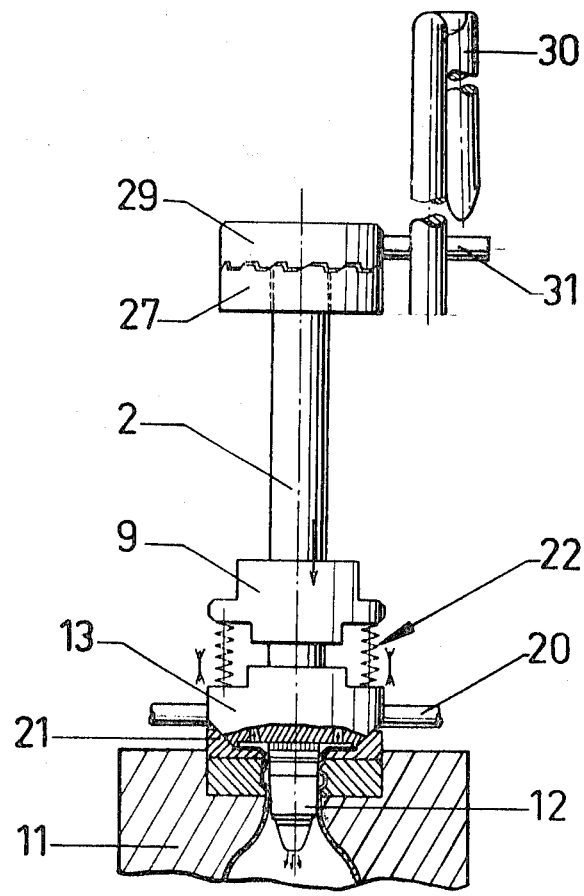

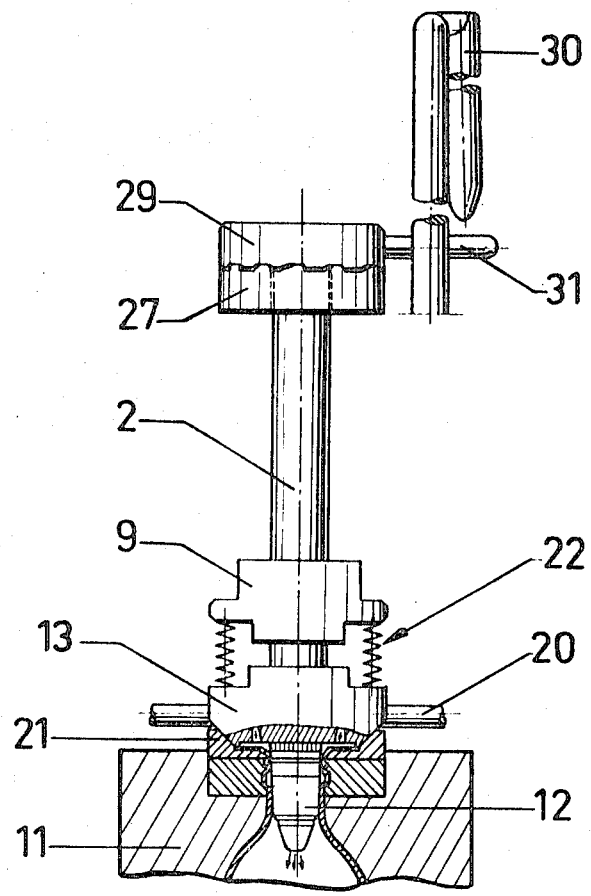

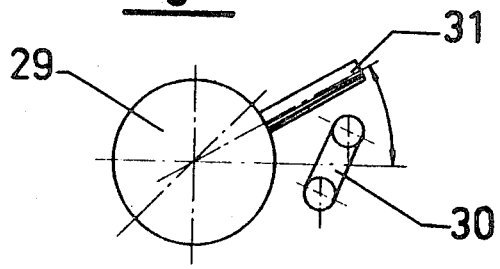
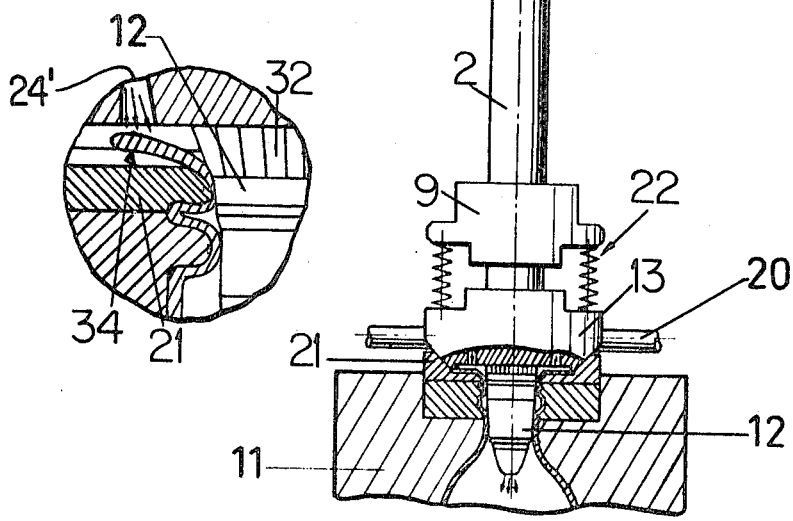

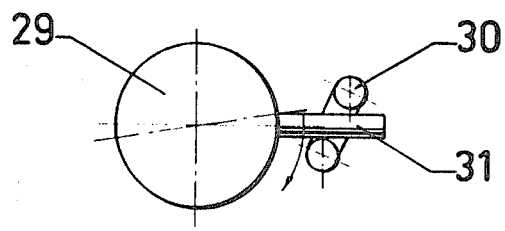
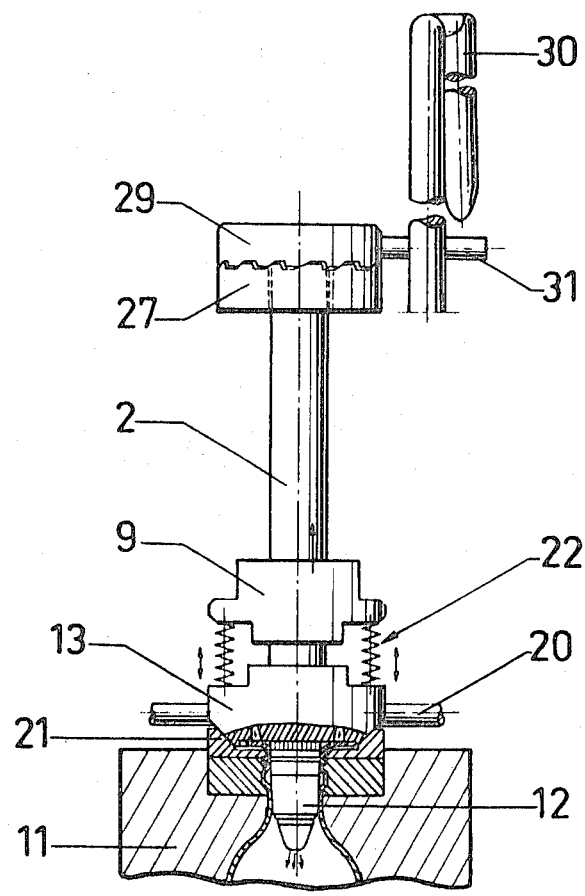

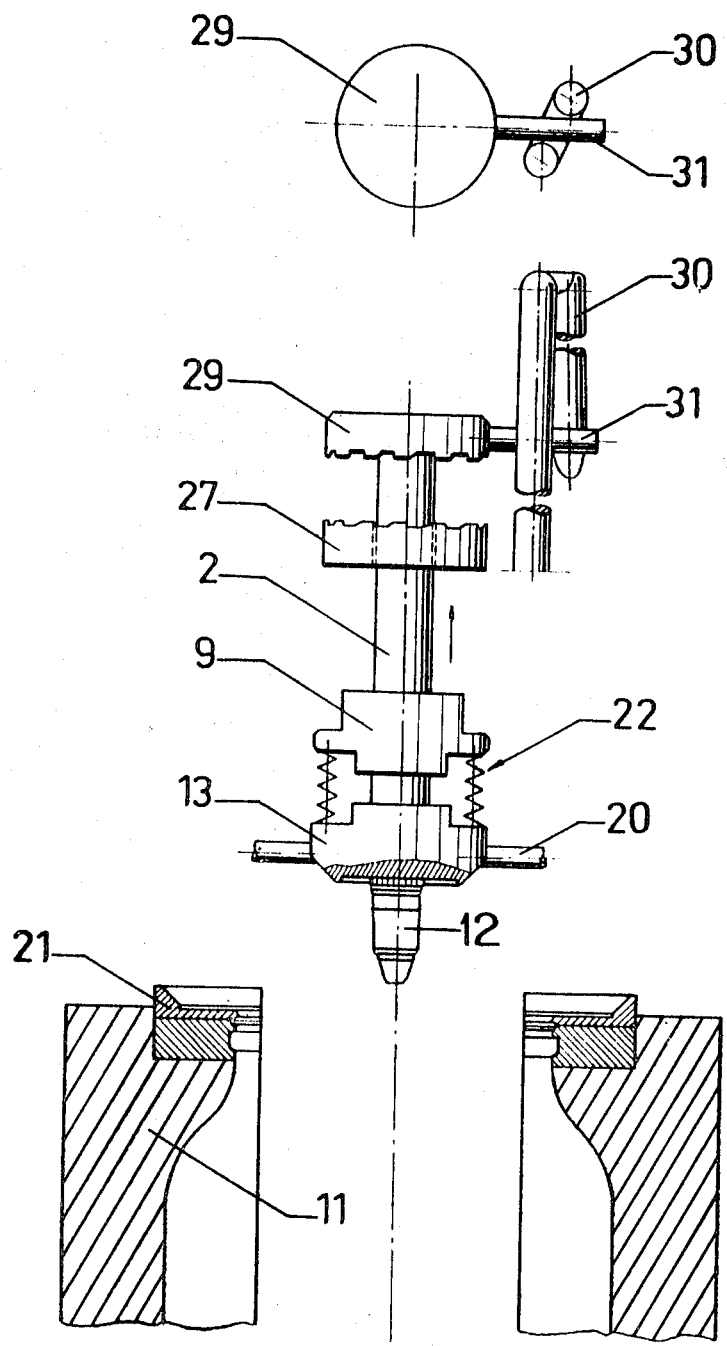

United States Patent Office 3,657,406
Patented Apr. 18, 1972

3,657,406
METHOD AND APPARATUS FOR REMOVING BURRS FORMED ON THE NECK OF HOLLOW BODIES
Bernard Delebarre, Dijon, France, assignor to Solvay & Cie, Brussels, Belgium
Filed Oct. 17, 1969, Ser. No. 867,256
Claims priority, application Belgium, Oct. 18, 1968, 64,885
Int. Cl. B29c *17/07, 17/12*
U.S. Cl. 264—98                           9 Claims

ABSTRACT OF THE DISCLOSURE

The burr formed on the neck of a hollow body made of plastic material in a blow mold having an opening for the insertion of a plastic parison is automatically removed. A blow nozzle having a hollow cutting mandrel at the blowing tip thereof is inserted into the plastic parison. The burr is sheared from the hollow body by bringing the hollow cutting mandrel and the mold opening against one another with an axial displacement of the nozzle in two successive steps, with the parison open and lying between the mandrel and the mold opening. Thereafter, the blow nozzle is rotated about its longitudinal axis to completely sever the burr from the hollow body. A jack having a stationary heel controls the alternating displacement of the blow nozzle, with the nozzle body extending through the jack. A first spiral clutch jaw is mounted on the stationary heel for rotation only. The teeth of this jaw have the shape of a right angle trapezium with a flat crest. A second spiral clutch jaw, identical to the first jaw, is fixedly mounted at the end of the nozzle body for alternately meshing and releasing with respect to the first jaw as the nozzle body is reciprocated by the control jack. A guide cooperating with the second jaw forces the latter in crest abutment with the first jaw during the first step.

BACKGROUND OF THE INVENTION

The present invention relates to a method for automatically removing the burr from the neck of hollow bodies made of plastic material during their manufacture by blow molding. The invention also relates to a device specially adapted to carry out the method.

The usual technique of blow molding a hollow body consists in inserting a parison of hot tubular material into a mold in such a manner as to seal one of its ends, and to blow this parison into conformance with the mold cavity by means of a blow nozzle inserted into the open end of the parison. This open end is intended to form the desired neck of the hollow body. After unmolding, a hollow body is generally obtained in which the upper portion of the neck has a burr that must be removed in a subsequent manual or mechanical operation.

Because of the high productive capacity of present apparatuses for blow molding of hollow bodies, manual burr removing requires a good deal of manpower and is consequently costly.

Mechanically removing the burrs from hollow bodies after unmolding requires the use of additional apparatus that must have a productive capacity equal to that of the molding machine. These apparatuses are generally costly from the point of view of purchase, maintenance and supervision.

Apparatuses for the blow molding of hollow bodies have been proposed in which the removal of the burr from the neck of the bodies is carried out during their molding. The present inventor has noted, however, that none of these will make it possible to obtain hollow bodies in which the upper end of the neck is ready to receive a cap or a sealing plug. Indeed, this portion of the hollow body will generally be uneven as a result of an imperfect burr removal, and it will be difficult to obtain a proper closure.

SUMMARY OF THE INVENTION

The instant inventor has now perfected a method and a device for the automatic removal of burrs on the neck of hollow bodies made of plastic material during their blow molding; a method and apparatus that ensure perfect removal of the burrs, and that are adaptable, without costly modifications, to numerous conventional devices for the molding of hollow bodies by blowing extrusion.

In the method according to the invention, removal of the burrs from the neck of molded hollow bodies is obtained by a two-step axial displacement of the blowing nozzle, followed by a rotation of the latter about its longitudinal axis, the shearing of the burrs being caused by the mold inlet in cooperation with a hollow cutting mandrel surrounding the blow nozzle.

In the first step of the axial displacement of the blow nozzle, the movement of the latter is limited in such a way that the burrs are sheared almost completely between the cutting mandrel and the mold inlet.

In the second step of the axial displacement of the blow nozzle, the movement of the latter is limited in such a way that the burrs are completely sheared between the cutting mandrel and the mold inlet.

After being completely sheared, the burrs are driven by the rotation of the blow nozzle in such a way as to completely sever them from the neck of the hollow bodies.

The blow nozzle is preferably provided with expansion, or blowing fluid right at the first step of the axial displacement of the blow nozzle.

The burr, severed from the neck of the hollow body and surrounding the hollow cutting mandrel, is ejected during the return movement of the blow nozzle to its initial position.

The device according to the invention comprises a blow nozzle, of which the end is surrounded by a hollow cutting mandrel, and control means ensuring the axial displacement and rotation around its longitudinal axis of the blow nozzle. The control means limits the axial displacement in each of its two steps.

The upper end of the hollow cutting mandrel is conical and is provided with burr engaging means.

According to a preferred embodiment of the invention, the control means for providing the axial displacement, limited in each of its two steps, of the blow nozzle, and then its rotation about its longitudinal axis comprise:

A jack for controlling the axial displacement of the blow nozzle, the rod of the blow nozzle extending through the jack;

A spiral clutch jaw, the teeth of which are upwardly directed, and are each shaped as a right angle trapezium in cross section; the said jaw being freely mounted on the heel of the jack;

A second spiral clutch jaw, identical to the first one, the teeth of which are downwardly directed, and which is keyed to the rod of the blow nozzle; these two jars being complementary with respect to one another;

An actuator controlling the rotation of the first, or free, spiral clutch jaw;

A guide ensuring, at the beginning of a cycle, registering, or coincidence, of the flat outward surfaces of the jaws.

The operation of this particular device is as follows:
(1) The axial displacement of the nozzle in the first step is controlled by the jack and is limited by the meeting of the flat surface of the teeth of the two jaws.

(2) The axial displacement of the nozzle in the second step is controlled by the actuator, and is limited by the complete meshing of the jaws. This meshing is made possible by the rotation of the free jaw by the acutator.

(3) As soon as the jaws completely mesh, rotation of the free jaw by the actuator drives the keyed jaw and causes it to rotate.

The head of the blow nozzle preferably comprises means to obtain a perfect centering of the nozzle in the parison to be blown, to cool the burr during blowing of the parison and to eject the burr after unmolding of the blown hollow body.

It is obvious that the profiles of the mandrel and of the mold inlet, or opening, must be designed in such way as to ensure a proper burr-removal during their relative displacements.

BRIEF DESCRIPTION OF THE DRAWINGS

FIG. 1 is a side elevation view, partly in cross section, of the tip of a blow nozzle suitable for carrying out the method according to the invention.

FIG. 2 is a side elevation view of the device for controlling the displacement of the blow nozzle.

FIG. 3 is an elevation view in a plane at right angles to the plane of FIG. 2.

FIG. 4a is a top plan view of the device of FIG. 4b.

FIG. 4b is a side elevation view, partly in cross section, showing a step in the operation cycle of the device according to the present invention.

FIG. 5a is a top plan view of the device of FIG. 5b.

FIG. 5b is a side elevation view, partly in cross section, showing another step in the operation cycle of the device according to the present invention.

FIG. 6a is a top plan view of the device of FIG. 6b.

FIG. 6b is a side elevational view, partly in cross section, showing yet another step in the operation cycle of the device according to the present invention.

FIG. 6c is a detail view of the area enclosed by a circle in FIG. 6b.

FIG. 7a is a top plan view of the device of FIG. 7b.

FIG. 7b is a side elevation view, partly in cross section, showing yet another step in the operation cycle of the device according to the present invention.

FIG. 8a is a top plan view of the device of FIG. 8b.

FIG. 8b is a side elevation view, partly in cross section, showing yet another step in the operation cycle of the device according to the present invention.

FIG. 9a is a top plan view of the device of FIG. 9b.

FIG. 9b is a side elevation view, partly in cross section, showing yet another step in the operation cycle of the device according to the present invention.

FIG. 9c is a detail view of the area enclosed by a circle in FIG. 9b.

FIG. 12a is a top plan view of the device of FIG. 12b.

FIG. 12b is a side elevation view, partly in cross section, showing yet another step in the operation cycle of the device according to the present invention.

FIG. 16a is a top plan view of the device of FIG. 16b.

FIG. 16b is a side elevation view, partly in cross section, showing yet another step in the operation cycle of the device according to the present invention.

DESCRIPTION OF THE PREFERRED EMBODIMENT

Figure 10A:
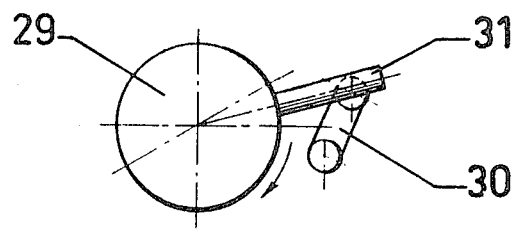
FIG. 10a is a top plan view of the device of FIG. 10b.

As shown in FIG. 1 of the drawings, the blow nozzle 1 is secured on the extension of a rod 2 of a vertical pneumatic jack 3 (see FIG. 2), the connection between the two being obtained by means of a threaded rod 4 and two locking nuts 5 and 6.

The blow nozzle comprises a body 7, a blow nozzle head 13 and a support 9 for the head 13.

A ball bearing 8 is mounted on the body 7 of the blow nozzle to allow rotation of the latter with respect to the support 9 of the blow nozzle head 13.

The nozzle body 7 comprises, centrally and along its axis, a conduit 10 for compressed fluid coming from a source feeding a chamber in the rod 2 of the jack 3 so as to allow blowing of a parison, or blank, 33 (see FIG. 4) housed within the mold 11.

A cutting mandrel 12 is secured, as by screwing, on the tip of the body 7.

The support 9 for holding the head 13 of the blow nozzle comprises a support ring 14 for the ball bearing 8, a stop ring 15 and a protecting ring 16.

The support ring 14 is formed with a flat annular ledge, which serves to connect it with the head 13 of the blow nozzle by means of three centering rods 17.

All of this assembly, that is, all of the blow nozzle 1, is solid with the rod 2 of the jack 3 and follows the latter in its axial displacement. On the other hand, rotation of the nozzle body 7 is not transmitted to the head support 9 because of the ball bearing 8.

The nozzle head 13 comprises a slidable centering tip 18, a centering ring 19, the aforementioned three centering rods 17, three support arms 20 and a device for the cooling of the burr to be removed. The slidable centering tip 18 is used for centering the assembly by its 45° conical surface. This conical surface mates with a similar conical surface of an extruder plate 21, the latter being fitted to the mold 11 and defining the blowing orifice 36.

The centering ring 19, preferably made of graphite bronze, ensures centering of the slidable centering ring 18 on the body 7 of the blow nozzle, and guides the body during rotation in the head 13. Furthermore, centering ring 19 guides the body 7 in the head 13 during its axial displacement.

The material of this centering ring 19 must be selected so that the friction losses will be as small as possible.

The three centering rods 17, arranged at 120° from one another, are screwed in the slidable centering tip 18 and slide in the ledge of the ring 14 supporting the ball bearing 8. Springs 22 surrounding the centering rods 17 bias the centering tip 18 away from the support ring 14.

The support arms 20 are also spaced 120° apart and are screwed into the slidable centering tip 18. The arms 20 hold the blow nozzle in position while the mold 11 is being opened, so that, as will be explained hereinafter, damage to the neck of the blown hollow body is avoided prior to its ejection by the abrupt descent of the head 13 due to extension of the three springs 22.

The cooling device comprises an air supply inlet 23 formed in the slidable centering tip 18 and opening into an annular chamber 24 machined in the centering ring 19.

This annular air chamber 24 feeds four grooves 24', only two of which are shown in FIG. 1, also machined in the centering ring and spaced at 90° from one another. These four grooves 24' open up at the lower end of the head 13 of the blow nozzle, that is, directly on the burr to be removed. Finally, an exhaust conduit 25 allows the cooling fluid confined between the lower end of the head 13 and the upper face of the extruder plate 21 to escape, so as to avoid the formation of an air cushion that would hinder proper centering of the two parts.

As shown in FIGS. 2, 3 and 4, the jack 3 is secured on a stationary support 26 and its heel 37 is fitted out with a freely rotating toothed wheel, or spiral clutch jaw, 27. This jaw 27 may be rotated by means of an actuator 28, but obviously remains stationary with respect to the axis of jack 3. Actuator 28 may be of any well known type, such as pneumatic. As illustrated in FIG. 4, the teeth of jaw 27 are each shaped as a right-angled trapeze, defining a flat crest, a vertical and an inclined wall.

On the other hand, the extension of the rod 2 of the jack 3 that extends through the latter is also provided with a spiral clutch jaw 29 identical to jaw 27 and keyed on the said extension of rod 2. A guide 30, in cooperation with a lug 31 secured on the jaw 29, serves to cause registering or coincidence of the flat parts of the teeth of jaws 27 and 29 at the beginning of the burr-removal cycle.

It should be noted that the upper part of the mandrel 12 flares out and is provided with burr-engaging grooves or indentations 32.

OPERATION OF THE APPARATUS

In the starting position illustrated in FIG. 4, the parison 33 to be blown, which can be extruded out of a plastic material, is confined in the mold 11 and is ready to be shaped. The blow nozzle 1 is in its high position, the jaws 27 and 29 are separated and the lug 31 is engaged in the stationary guide 30, ensuring registering of the flat parts of the teeth. The springs 22 are relaxed and the blow nozzle head 13 is separated from the nozzle head support 9 to the maximum extent.

FIRST DOWNWARD MOVEMENT OF THE BLOW NOZZLE, FIGS. 5–6

Motor fluid is sent to the jack 3 to cause rapid descent of the blow nozzle 1. Compressed fluid may also be admitted at this time in the central conduit 10 (see FIG. 1) of the nozzle and this will cause spreading of the lips of the still hot parison 33 (FIG. 5) and facilitating insertion of the mandrel 12 in the neck of the hollow body to be molded without creasing the material in that zone. Similarly, the fluid circuit for cooling the burr may also be admitted.

The distance $x$ (FIG. 5) between the level of the teeth of the jaw 27 and the level of the extrusion plate 21 being smaller than the distance $y$ between the level of the teeth of the jaw 29 and the lower level of the nozzle head 9, these distances being adjustable during mounting, the conical surface of the slidable centering tip 18 meets the conical surface of the extrusion plate 21 when the two levels of the jaws 27 and 29 are still at a distance $y-x$. From that moment on, the body 7 and the support 9 continue to descend and the blow nozzle slides through its head 13.

During this movement, the springs 22 around the centering rods 17 are compressed and a close contact between the head 13 and the extruder plate 21 of the mold is obtained resulting in a proper centering of the two parts.

The descending movement of the nozzle is stopped when the two flat surfaces of the teeth of jaws 27 and 29 come in contact with one another.

The various parts that make up the blow nozzle are designed in such a way that at the end of this displacement the mandrel, in cooperation with the blow orifice of the mold 11 defined by the extruder plate 21, has almost completely broken the burr 34, as shown in detail in FIG. 6c.

It has indeed been noted that if the burr is completely broken before the blowing of the parison is completed, the latter tends to contract inside the mold, resulting in a faulty plugging orifice. By proceeding as described, the parison 33 is always held within the mold during blowing.

SECOND DESCENDING MOVEMENT OF THE BLOW NOZZLE, FIG. 7

To cause the second descending movement of the nozzle and the complete shearing of the burr, the actuator 28 must be energized with motor fluid. The jaw 27 then starts to rotate, causing progressive and fast engagement of the teeth of the two jaws. The rod 2, always acted up by the jack 3, now moves down a distance equal to the depth of the jaw teeth. As a consequence, the cut out mandrel 12 continues its downward movement and completely cuts the burr. In this movement, the upper flaring out part of the mandrel 12 causes spreading of the burr and its engagement by the grooves or indentations 32 of which the upper part is provided, as shown in detail in FIG. 9c.

ROTATION MOVEMENT OF THE BLOW NOZZLE, FIGS. 8–9

When the teeth of the jaws 27, 29 (FIG. 9) completely mesh, rotation of jaw 27 results in the rotation of jaw 29 and, consequently, of rod 2 of the blow nozzle. Mandrel 12 also rotates, since it is rigidly attached to rod 2. Because of the grooves or indentations 32 on mandrel 12, the burr 34 is likewise brought into rotation, and this operation ensures its complete severing from the hollow body.

As soon as jaw 29 is brought into rotation, lug 31 moves away from guide 30. The profile of this guide 30 is such that this rotation is allowed only when jaws 27 and 29 completely mesh.

RETURN TOWARD STARTING POSITION FIGS. 10–16

Figure 10B:
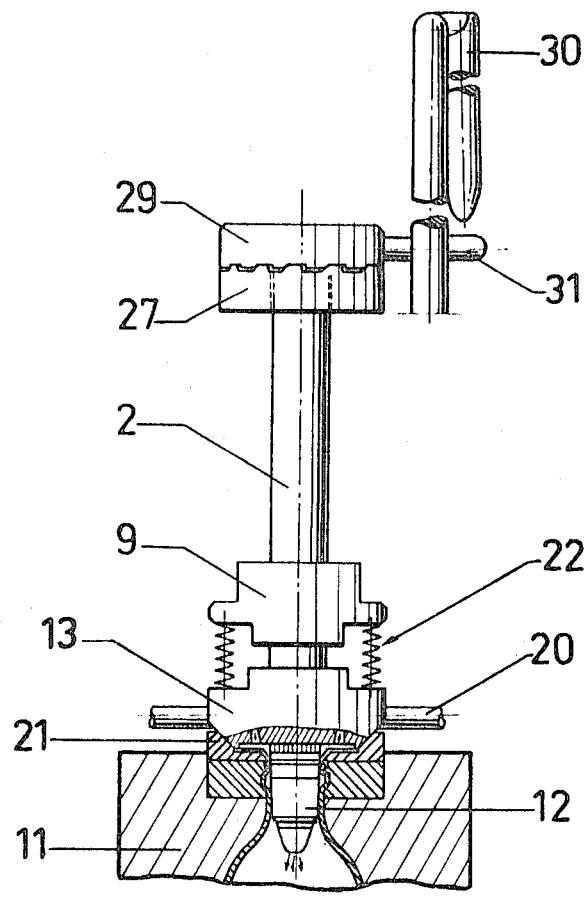
FIG. 10b is a side elevation view, partly in cross section, showing yet another step in the operation cycle of the device according to the present invention.
Figure 11A:
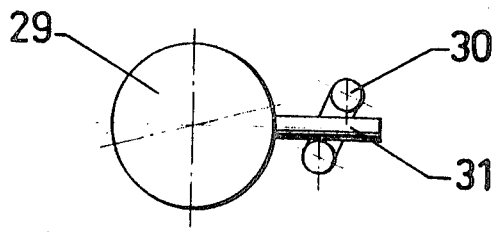
FIG. 11a is a top plan view of the device of FIG. 11b.
Figure 11B:
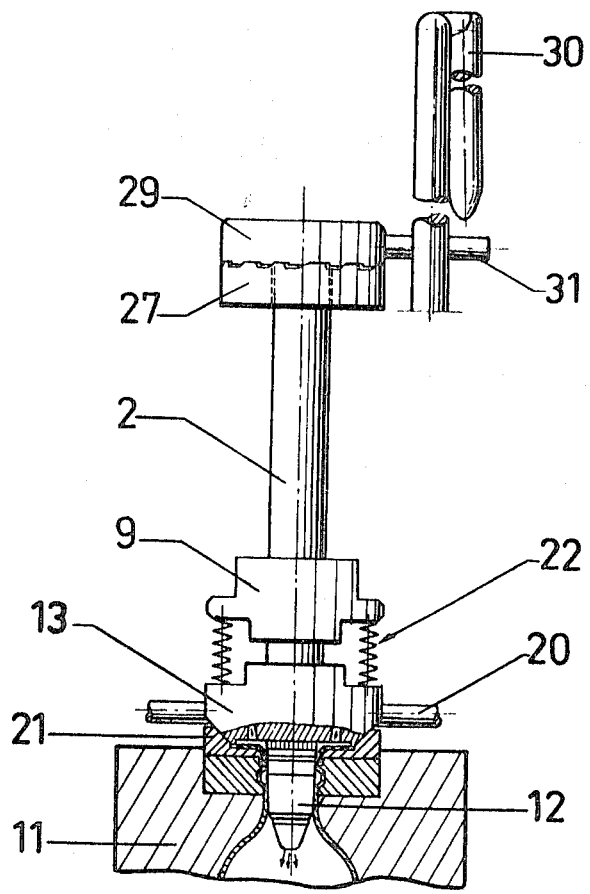
FIG. 11b is a side elevation view, partly in cross section, showing yet another step in the operation cycle of the device according to the present invention.

When the actuator 28 reaches the end of its stroke (dead-center position), its feeding is reversed, causing rotation of jaw 27 in the opposite direction to its previous rotation (FIG. 10). During this movement, jaw 27 drives jaw 29, and, consequently, mandrel 12, until such time where lug 31 abuts against guide 30 (FIG. 11).

Figure 13A:
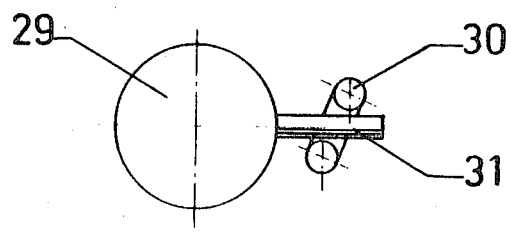
FIG. 13a is a top plan view of the device in FIG. 13b.
Figure 13B:
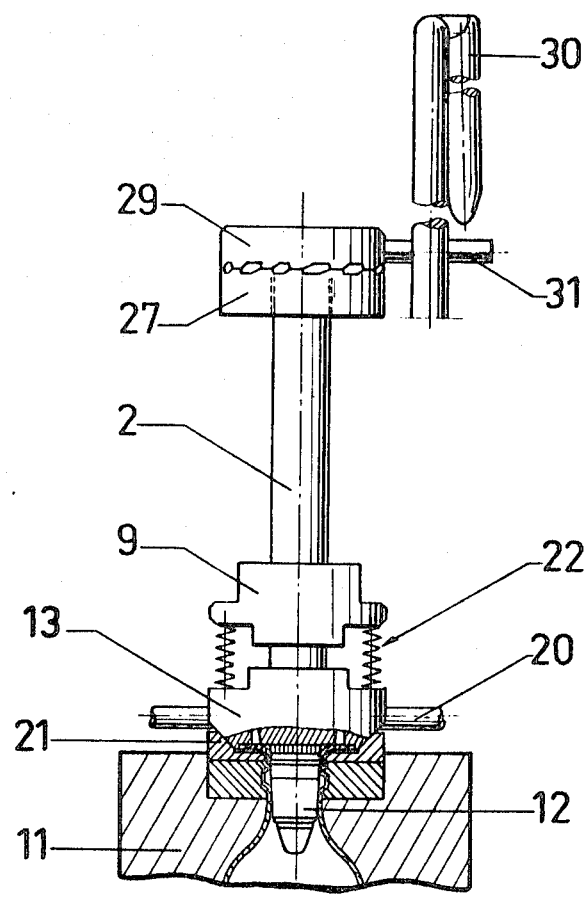
FIG. 13b is a side elevation view, partly in cross section, showing yet another step in the operation cycle of the device according to the present invention.

Rotation of jaw 27 continues, while jaw 29 is thus stopped. The inclined faces of the teeth of these two jaws slide one over the other, causing upward displacement of jaw 29 until the flat parts of the teeth of each of the two jaws are again in registry, or coincide with one another (FIGS. 12–13). Thus, springs 22 are partially released and burr 34, already sheared and inserted in the grooves or indentations 32, separates from the neck of the hollow body. At this moment, a timer or any other well known, suitable control means (not shown) stops the blowing of the hollow body and the flow in the burr cooling circuit.

Figure 14A:
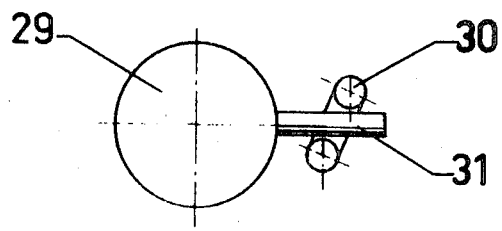
FIG. 14a is a top plan view of the device of FIG. 14b.
Figure 14B:
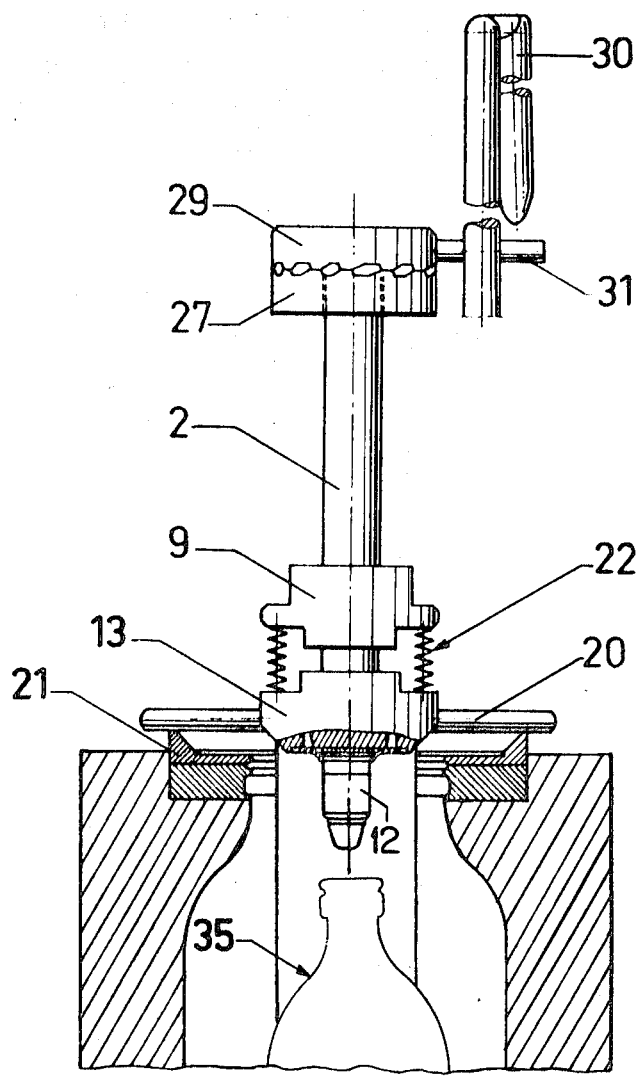
FIG. 14b is a side elevation view, partly in cross section, showing yet another step in the operation cycle of the device according to the present invention.

During the following stage, mold 11 gradually opens and the blown, hollow body 35 is ejected. When the mold starts to open, the three arms 20 hold the nozzle head 13 from moving further down, in order to avoid a sudden expansion of the springs 22 and damage the neck of the hollow body 35 before its ejection (FIG. 14).

Figures 15A, 15B:
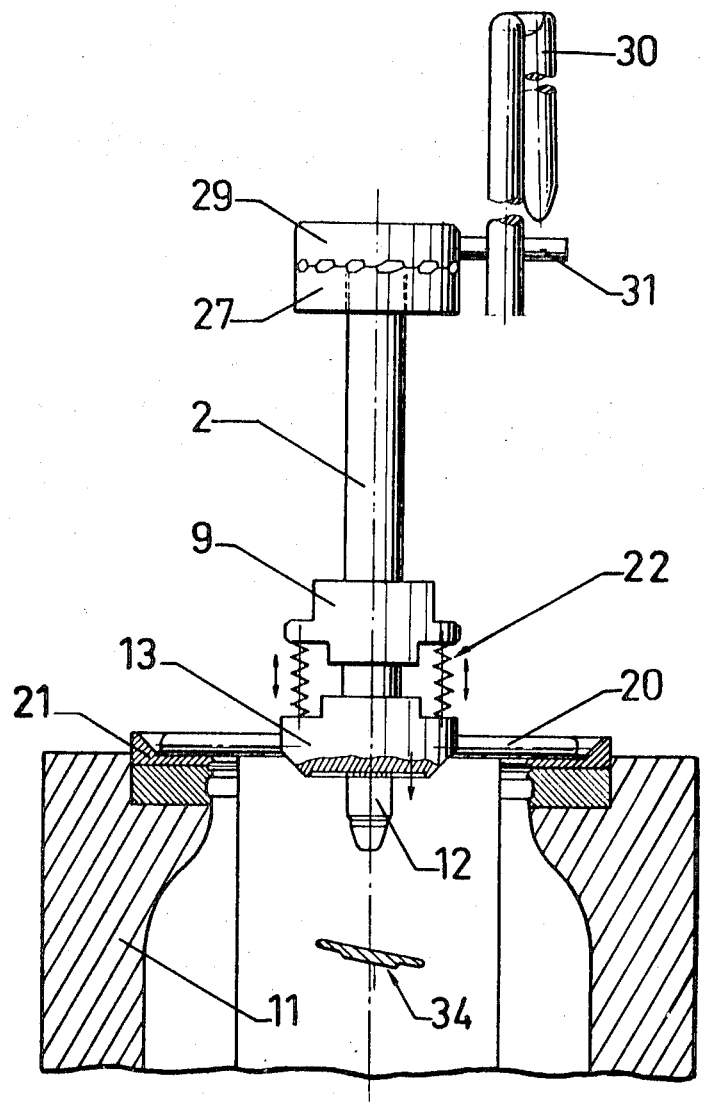
FIG. 15a is a top plan view of the device of FIG. 15b.
FIG. 15b is a side elevation view, partly in cross section, showing yet another step in the operation cycle of the device according to the present invention.

Thereafter, while the mold 11 continues its opening movement, the arms 20 slide over the edge of the extruder plate 21 until the opening of the mold is greater than the diameter of the three arms. At that time, under the effect of the complete release of the three springs 22, the nozzle head 13 abruptly falls and the lower part of its slidable centering tip 18 causes the ejection of the burr 34 surrounding the mandrel 12. This burr may be recuperated and recycled after crushing (FIG. 15).

Finally, the feed of motor fluid to the jack 3 is reversed, causing an upward movement of the blow nozzle assembly 1 back into its starting position. During this rise, the lug 31 slides into its guide 30 to ensure proper positioning of the jaw 29 in relation to the jaw 27 and, consequently, proper return of the apparatus to starting position for a new work cycle (FIG. 16).

It will be understood that the above description of the present invention is susceptible to various modifications, changes and adaptations.

What is claimed is:

1. In a method for automatically removing the burr formed on the neck of a hollow body made of plastic material in a blow mold having an opening for the insertion of a plastic parison into the open end of which a blow nozzle having a cutting mandrel at the blowing tip thereof is inserted, the blow nozzle being displaceable along its longitudinal axis to be inserted into the open end of such parison, the improvement comprising the steps of:
 (a) shearing said burr by bringing said cuting mandrel and mold opening toward one another in two successive shearing steps of axial displacement with the open end of the holow body lying between said mandrel and mold opening, said axial displacement of said blow nozzle and said mandrel during the first one of said two successive shearing steps being limited to a distance such as to cause only partial shearing of the burr and to hold the parison,
 (b) subsequently rotating said blow nozzle about its longitudinal axis to cause complete severing of the burr from the hollow body, and
 (c) blowing expansion fluid through said blow nozzle before the second one of said two successive shearing steps.

2. A method as claimed in claim 1 wherein said axial displacement of said blow nozzle and said mandrel during the second one of said two successive steps is limited to a distance such as to cause complete shearing of the burr.

3. A method as claimed in claim 1 wherein the burr, after complete shearing from said body at the end of said second step of said two successive steps, is brought into rotation by said mandrel to ensure the complete severing of the burr from said body.

4. A method as claimed in claim 1 including blowing expansion fluid into the parison during the first one of said two successive steps.

5. A method as claimed in claim 4 including cooling said burr during blowing of the parison.

6. A method as claimed in claim 1 including returning said blow nozzle to its initial position after completion of the rotation step and simultaneously ejecting the burr from said mold.

7. In an apparatus for automatically removing the burr formed on the neck of a hollow body made of plastic material in a blow mold having an opening for the insertion of a plastic parison into the open end of which the blowing end of a blow nozzle having an elongated body is inserted, the improvement comprising, in combination:
 (a) a cutting mandrel mounted around the blowing end of said nozzle, said mandrel having a shearing portion constituted by an outwardly flaring part of said mandrel, and means on said shearing portion to grip said parison open end to sever it from the resulting hollow body; and
 (b) drive means connected for displacing said blow nozzle and mandrel along the axis of said nozzle to bring said mandrel shearing portion and mold opening against one another in two successive steps with said parison open end lying between said mandrel shearing portion and mold opening and to cause rotation of said nozzle and mandrel shearing portion at the termination of said second step, said drive means comprising:
  (i) a jack having a stationary heel, said jack controlling the alternating displacement of said blow nozzle with said body extending through said jack;
  (ii) a first toothed wheel mounted on said stationary heel for rotation only; the teeth of said wheel having, in cross section, the shape of a right angle trapezium with a flat crest, a right angle face on one side and an inclined face on the other side;
  (iii) a second toothed wheel, identical to said first wheel, fixedly mounted at the end of said nozzle body opposite said blowing end for meshing engagement with said first wheel and released therefrom as said nozzle body is reciprocated by said control jack;
  (iv) an actuator for rotating said first wheel to cause rotation of said second wheel, when said wheels are in mesh, and thus cause rotation of said nozzle body; and
  (v) guiding means cooperating with said second wheel to force said second wheel in crest-to-crest abutment with said first wheel during said first step.

8. A combination as claimed in claim 7 further comprising means for ensuring proper guiding of said blowing end of said nozzle into said parison.

9. A combination as claimed in claim 8 wherein said guiding means comprises:
 (a) an extruder plate fixed to said mold and centrally formed with an opening registering with said mold opening; said extruder plate further formed with a conical surface surrounding said opening and facing said nozzle;
 (b) a guiding head mounted for slidable displacement along said nozzle body and resilient means connecting said head and body to allow said slidable displacement;
 (c) said head formed with a conical surface mating with said extruder plate conical surface during shearing and severing of said burr to ensure guiding of said blow nozzle into said mold opening.

References Cited
UNITED STATES PATENTS

| | | | |
|---|---|---|---|
| 3,209,400 | 10/1965 | Di Settembrini | 18—5 BS |
| 3,369,272 | 2/1968 | Martin, Jr. et al. | 18—5 BS |
| 3,487,501 | 1/1970 | Siard et al. | 18—5 BS |

ROBERT F. WHITE, Primary Examiner

J. H. SILBAUGH, Assistant Examiner

U.S. Cl. X.R.

18—5 BH, 5 BQ, 5 BS; 264—161